Oct. 3, 1933.　　　T. BROWN　　　1,928,961
TRACTOR
Filed Sept. 16, 1929　　2 Sheets-Sheet 1
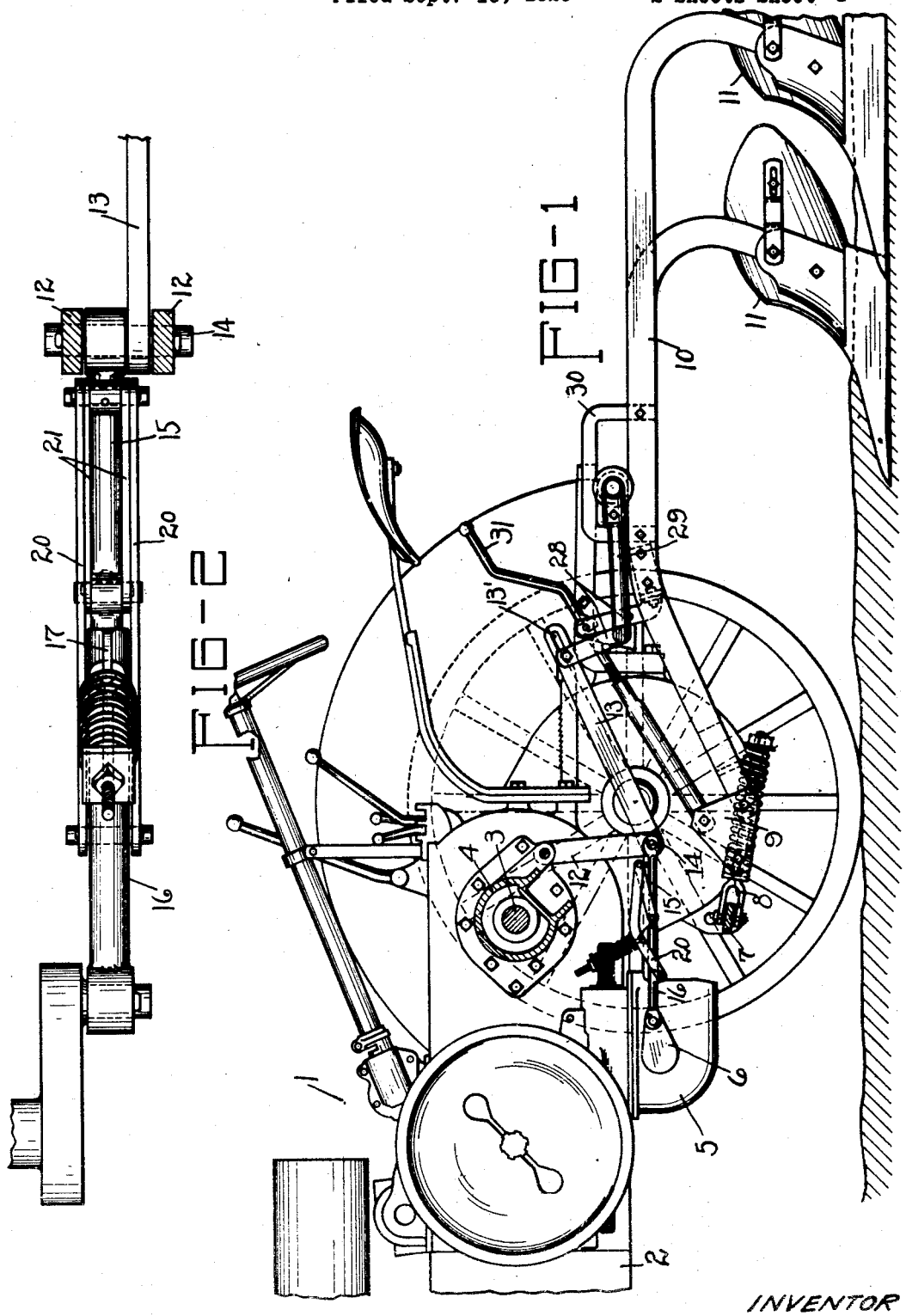
INVENTOR
Theophilus Brown
BY Brown, Jackson, Boettcher & Dienner
ATTORNEYS
WITNESS Oct. 3, 1933.                T. BROWN                 1,928,961
                              TRACTOR
                       Filed Sept. 16, 1929         2 Sheets-Sheet 2
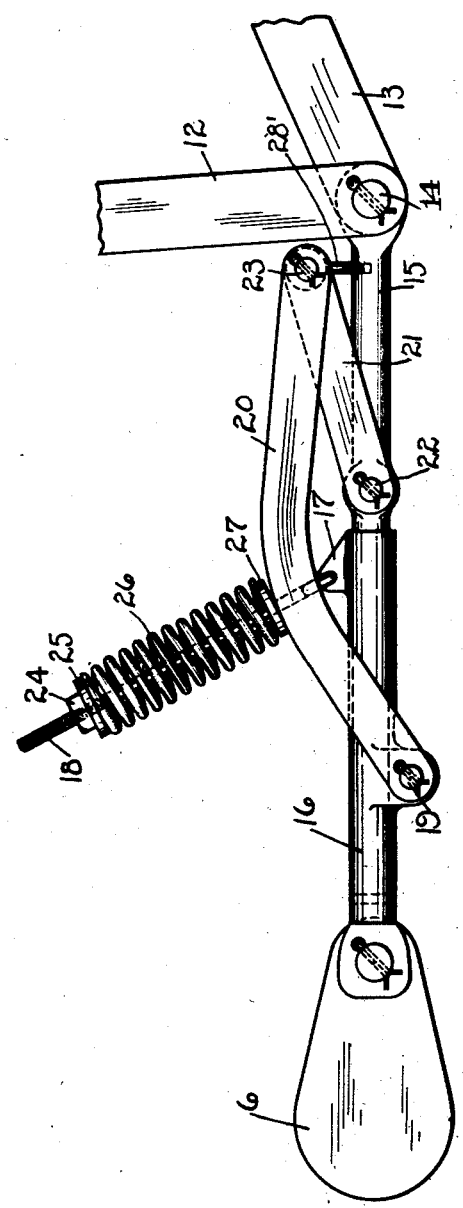
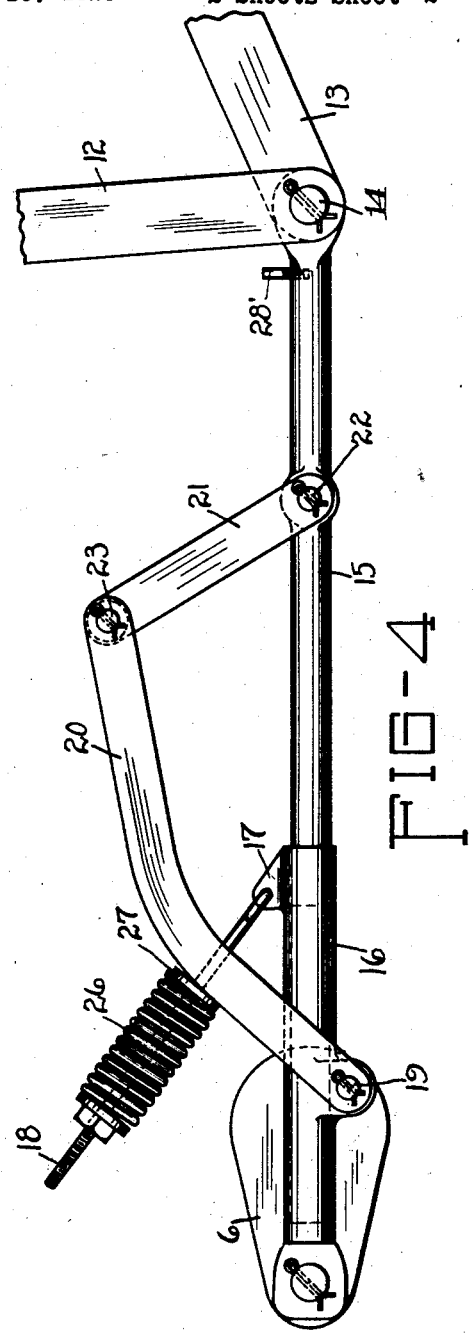
WITNESS
Walter Ackerman
INVENTOR
Theophilus Brown
BY
Brown, Jackson, Boettcher & Dienner
ATTORNEYS Patented Oct. 3, 1933

1,928,961

UNITED STATES PATENT OFFICE 1,928,961

TRACTOR

Theophilus Brown, Moline, Ill., assignor to Deere & Company, Moline, Ill., a corporation of Illinois Application September 16, 1929
Serial No. 392,848

33 Claims. (Cl. 97—50)

This invention relates to tractors generally, and especially to those which are adapted to draw agricultural cultivating tools such as plows and the like. My invention resides in an improvement of the power-lift device by which the motive power of the tractor is utilized to lift the tools to inoperative position, as is necessary in turning at the end of the row or furrow and in transporting the implement from one field to another.

In the operation of tractor plows and the like, it sometimes occurs that at the time it is desired to lift the tools they are deep in hard ground or not infrequently caught in roots or other fixed objects. Continued application of power to the lift mechanism is, under such circumstances, likely to strain the connecting mechanism and cause breakage of some of the parts. Obviously, many other situations might arise where continued operation of the power lifting mechanism would be undesirable.

It is one object, therefore, of my invention to provide a yieldable force transmitting connection adapted to automatically unlock when called upon to transmit a force which is greater than a predetermined maximum. A further object of my invention is to provide a means for relieving a power lift mechanism when a predetermined or greater resistance is met with in the lifting operation.

Another object of my invention is to provide, in combination with a power lift, means adapted to transmit, as a rigid unit, the normal lifting effort but which is so constructed and arranged as to yield when a force greater than a predetermined maximum is required to elevate the tools.

A still further object of my invention is to provide a connecting means having the above characteristics and which is so constructed as to be automatically reset.

Other objects and advantages of my invention will appear to those skilled in the art after consideration of the following description, taken in connection with the accompanying drawings, in which:

Fig. 1 is an elevation showing my device in position on a tractor;

Fig. 2 is an enlarged top view of the power lift relief mechanism showing the latter in locked position;

Fig. 3 is a side view of the power lift mechanism in locked position;

Fig. 4 is a side view of the release mechanism when in unlocked position.

For the purpose of illustrating one structural embodiment of my invention I have chosen a tractor plow of the type shown and described in my copending application, Serial No. 399,913, filed October 16, 1929 and wherein a tractor, adapted to draw one or more plows, is provided with a power lift for elevating the plows above the ground to transport position. In connection with the power lift mechanism I have provided a spring release device which will unlock when the load to be lifted reaches a certain maximum, thereby preventing injury to the power lift mechanism or to the plow.

In Fig. 1, I have shown a tractor, indicated as a whole by the numeral 1, which tractor includes a motor 2 and a drive shaft 3 carried in a housing 4, which drive shaft is adapted to transmit power to the rear tractor wheels. The numeral 5 indicates a power lift mechanism of any well known type deriving its power from the motor of the tractor. As the power lift per se does not form a part of my invention I shall not describe it except to say that it comprises an extension crank, indicated at 6, which is adapted to be turned a half revolution each time the lift mechanism is actuated. One preferred type of power lift clutch which I may employ is disclosed in my copending applications Serial No. 128,929 filed August 13, 1926 and Serial No. 216,049 filed August 29, 1927. Carried by the frame of the tractor is a draft bar 7 to which is pivotally secured, as by a clevis 8 and suitable depth adjusting mechanism 9, a number of plow beams 10 on which are mounted plow bodies 11. At the end of the row, or in moving the plow to and from the field, it is necessary to lift the plows to an elevated position.

In the tractor which I have shown, a pair of depending links 12 are pivotally connected at one end to the housing 4 and at the other end pivotally support one end of a lifting arm 13 by means of a pivoting bolt 14. These links 12 also carry a link 15, the latter having an eye received by the pivoting bolt 14, as shown in Figure 2. The link 15 is slidingly received within a sleeve member 16, which latter is pivoted at its forward end to the crank arm 6 of the power lift mechanism. The sleeve member 16 is provided at its rearward or open end with an upstanding perforated lug 17 in which is engaged the rod 18. Pivoted to the sleeve member 16, as by a pivot pin 19, are two links 20, between which the rod 18 passes. The link 15 also carries a pair of links 21, pivotally connected thereto intermediate its ends by a pivot pin 22, the two pairs of links 20 and 21 being pivoted together by the pivot pin 23.

The outer end of the rod 18 is threaded and carries a nut 24 and a washer 25, and 26 is a spring bearing at one end against said washer and nut and at the other end against the washer 27 which in turn bears against links 20. A small stop 28' is provided at the rearward end of the link 15 to limit the downward movement of the links 21 and to hold the pivot pin 23 slightly above the line joining the pivot pins 19 and 22. The normal or force transmitting position of the link and sleeve construction 15, 16 is shown in Fig. 3, in which it will be seen that the spring 26 of the above described structure bears downwardly against the links 20 to function as a biasing means that tends to hold the link 15 in the retracted position shown. Thus from the foregoing description, it is obvious that the links 20 and 21, together with the biasing structure including the spring 26, all comprise a yieldable means for connecting the members 6 and 13, or the links 15 and 16 which are respectively connected therewith, so that these parts will move together under normal operating loads while permitting relative movement therebetween under abnormal load conditions.

The pins 19, 22 and 23 being nearly in line with one another, the relatively light pressure of the spring 26 will hold the mechanism in the position shown in Fig. 3 under all normal load conditions, but if the load exceeds a predetermined maximum the force of the spring 26 will be overcome, the links 20 and 21 will be rotated in a counterclockwise direction, and will thus allow the link 15 to take the extended position shown in Fig. 4. It will be observed that once the force of the spring 26 is overcome and the links 21 rotated upward slightly, the crank arm 6 may complete its half revolution under comparatively light load, carrying the sleeve 16 with it to the position shown in Fig. 4. That is to say, after the approximately dead center relationship of the links 20 and 21 is once broken, very little force is necessary to further separate the members 15 and 16. The sleeve member 16 is purposely made sufficiently long so that the members 15 and 16 will not be separated when the mechanism moves to the position in Fig. 4.

As will be clear from Fig. 1, the lifting motion of the crank arm 6, transmitted by the link construction just described, is effective to elevate the plows by virtue of the lifting arm 13 acting to rock the lever 28 and thereby to swing the lifting bail 29 upwardly, the lever 28 being secured to said bail. The bail and lever have suitable pivotal mounting on bearing brackets carried by the frame of the tractor. Each plow beam 10 carries a yoke 30 secured thereto as by bolts and which receive the bail 29 in such a manner that the rotation thereof will act to elevate the plows 11, the plow beams 10 pivoting about their draft connection to the clevis 8.

This general relation of operating parts for raising the plow beams is disclosed in my Patent No. 1,722,781, dated July 30, 1929. The arm or link 13 is connected to the lever 28 through a slot 13' which accommodates depth adjustments effected through the depth adjusting crank 31.

One important feature of my invention resides in the fact that the link construction 15, 16 is adapted to be automatically reset. From Fig. 4 it will be seen that all that is necessary is to merely trip the power lift clutch a second time, causing the crank arm 6 to make a half revolution back to the position shown in Fig. 3, thus rotating the links 21 in a clockwise direction about their pivot pin 22 and bringing them again in contact with the stop 28', the position shown in Fig. 3. I attach considerable importance to the fact that my spring release acts as a rigid unit under all normal operating conditions, but which is adapted to unlock at a predetermined maximum load. The self-resetting feature of my spring release is, I believe, broadly new and of considerable importance since the operator is not required to leave his seat in returning the parts to normal position. Obviously the stop pin 28' may be made adjustable in height whereby the maximum load at which the spring release unlocks may be varied, and this maximum load may also be adjusted by screwing the nut 24 inwardly or outwardly to adjust the pressure of the spring 26.

Many other modifications will be suggested to those skilled in the art and I do not desire to be limited to the specific embodiment shown.

I claim:

1. In a power lift for a tractor, the combination of a power take-off, a tool to be elevated, and means connecting said tool and power take-off and including a spring pressed toggle adapted to yield under an abnormal load.

2. In a power lift for tractor plows, a combination of a power take-off, and means connecting the power take-off to the plow to be lifted, said means including a pair of folding links and spring means resisting relative movement of the links.

3. In a power lift for tractor plows, the combination of a power take-off, and means connecting the power take-off to the plow to be lifted, said means including a pair of relatively slidable members and resilient toggle means resisting such relative movement.

4. In a power lift for tractor plows, the combination of a power take-off, and means connecting the power take-off to the plow to be lifted, said means including a pair of relatively movable members and a spring pressed toggle adapted to yield under an abnormal load.

5. In a power lift for tractor plows, the combination of a power take-off, lifting arms to elevate the plows, and means connecting the power take-off to the lifting arms, said last mentioned means including relatively movable members and spring pressed toggle links biasing said members to retracted position, said spring pressed toggle links being adapted to yield under an abnormal load.

6. In a power lift for tractor plows, the combination of a power take-off, lifting arms to elevate the plows, and means connecting the power take-off to the lifting arms, said last mentioned means including relatively movable members and spring pressed toggle links biasing said members to retracted position, the toggle links being adapted to yield under an abnormal load and adapted to be restored to holding position by moving said members to retracted position.

7. A spring relief for a power lift having a crank arm rotatable through substantially a half revolution, said spring relief comprising a pair of relative movable parts, link means pivoted together and to each of said movable parts, and spring means acting through said link means to hold said parts retracted and in motion transmitting position, said spring means adapted to yield under abnormal load to permit said movable parts to move to extended position.

8. In combination, a power lift having a crank arm rotatable through substantially a half revolution, a spring relief having a pair of relatively movable parts, link means pivoted together and to each of said movable parts, and spring means acting through said links to hold said parts retracted and in motion transmitting position, said spring means adapted to yield under an abnormal load to permit said movable parts to move to extended position, and said link means being so arranged as to be restored to holding position by a half revolution of said crank arm.

9. A spring relief mechanism for a power transmitting connection, said relief mechanism comprising a pair of relatively slidable members, a pair of links pivoted to one of said members, spring means biasing said links for swinging movement relative to said one member, a pair of links connected to the other of said slidable members and to the other pair of links so that relative movement of said members will occasion a swinging movement of said first pair of links, said two pair of links adapted, when said members are in retracted position, to lie adjacent one another with the points of pivotal connection nearly in a straight line.

10. A spring relief mechanism for a power transmitting connection, said relief mechanism comprising a pair of relatively slidable members, a pair of links pivoted to one of said members, spring means pivotally mounted on one of said members for swinging movement relative to that member and biasing said links for swinging movement relative to said one member, a pair of links connected to the other of said slidable members and to the other pair of links so that relative movement of said members will occasion a swinging movement of said first pair of links, said two pair of links adapted when said members are in retracted position, to lie adjacent one another with the points of pivotal connection nearly in a straight line and, when said members are in extended position to lie just beyond a perpendicular position, one relative to the other, whereby said spring means holds the members in retracted position with a greater degree of force than is exerted when the members are in extended position, said spring means biasing said links being always substantially at right angles thereto.

11. A spring relief mechanism for a power transmitting connection, said relief mechanism comprising a pair of relatively slidable members, a pair of links pivoted to one of said members, swingingly mounted spring means on one of said members biasing said links for swinging movement relative to said one member, a pair of links connected to the other of said slidable members and to the other pair of links so that relative movement of said members will occasion a swinging movement of said first pair of links, said two pair of links adapted, when said members are in retracted position, to lie adjacent one another with the points of pivotal connection lying nearly in a straight line, and a stop carried by one of said members to limit the swinging movement of said first pair of links when the slidable members are in retracted position, said swinging spring means biasing said first mentioned pair of links being capable of functioning in a position inclined relative to one of said members.

12. A spring relief for power lifts, comprising a sleeve member, a rod member slidable in said sleeve member, link means pivoted to said sleeve member, a second link means pivoted to said rod, said two link means being pivoted together, the points of pivoting adapted to lie approximately in a straight line when said members are in retracted position, and spring means acting through said links to hold said members in retracted position.

13. A spring relief for power lifts comprising a sleeve member, a rod member slidably received in said sleeve member, link means pivoted at one end to said sleeve member, resilient means opposing the swinging of said link means in one direction, means pivotally connecting the other end of said link means to said rod member and so arranged that when said rod member moves from retracted to extended position said link means will be moved against the opposing force of said resilient means.

14. In a power lift for tractor plows the combination of a power take-off, means whereby the plows may be elevated, and yielding resettable means adapted to be released by an overload for connecting said elevating means with said power take-off.

15. In a power lift for tractor plows having a frame, and a plow pivotally connected to the frame, the combination of means for elevating the plow, said means including a series of links and resettable means adapted to be released by excess load for yieldingly connecting said links to said power take-off.

16. In a power lift for tractor plows having a frame, the combination of a power take-off, a bail for elevating the plow, a link member pivotally extended from said frame, link means connected at one end to said bail and at the other end to said link member, and power transmitting connections for connecting said power take-off to said link means, said power transmitting connections being adapted to be released at a predetermined maximum load and to be restored to power transmitting relation upon subsequent operation of said power take-off.

17. The combination with a tractor and an implement propelled thereby, said implement comprising a member movable thereon, of power take-off means on the tractor, mechanism for transmitting motion from said power take-off means to said movable member, said motion transmitting mechanism comprising two parts adapted to have relative movement for preventing the transmission of an overload through said mechanism, and a spring connected to resist such relative movement and arranged to exert a decreasing resistance with increasing movement between said parts.

18. The combination with a tractor and an implement propelled thereby, said implement comprising a member movable thereon, of power take-off means on the tractor, mechanism for transmitting motion from said power take-off means to said movable member, said motion transmitting mechanism comprising a plurality of parts adapted to have relative movement for preventing the transmission of an overload through said mechanism, and means to resist such relative movement and arranged to exert a decreasing resistance with increasing movement between said parts.

19. In a power-lift for tractor plows the combination of a power-lift device rotatable through substantially half revolutions, yieldable means connecting the plows with said power-lift for raising and lowering the plows, whereby rotation of the power-lift device during a half revolution elevates the plows and rotation through another half revolution lowers the plows as before elevation, said yieldable means adapted to be released during elevation of the plows at a predetermined excess load and to be restored to operative position by rotation of the power-lift device through a subsequent half-revolution.

20. An agricultural implement comprising a supporting frame, a tool beam, power-lift mechanism operable through predetermined cycles, and power transmitting connections for lifting said tool beam from said power-lift mechanism, said connections including parts adapted to be tripped under an overload and to be automatically reset by an operation of said power-lift mechanism through a subsequent cycle.

21. An overload release mechanism for power transmitting connections, said mechanism including a pair of relatively movable members and links, and biasing means pivotally associated for swinging movement with one of the members to hold them in extended or retracted position, said last named means arranged to yieldingly hold said members in one of their positions with a force equal to the normal force they are called upon to transmit and to release said members when the normal force is exceeded.

22. An overload release mechanism for power transmitting connections, said mechanism including a pair of relatively movable members and pivoted links, and biasing means pivotally associated with one of the members to hold them in extended or retracted position, said last named means arranged to cooperate with said links to yieldingly hold said members in one of their positions with a force equal to the normal force they are called upon to transmit and to release said members when the normal force is exceeded, said biasing means acting on said members with a reduced force after the members are released.

23. An overload release mechanism for power transmitting connections, said mechanism including a pair of relatively movable members and pivotally connected links, and biasing means pivotally associated for swinging movement with one of the members to hold them in extended or retracted position, said last named means arranged to cooperate with one of the links to yieldingly hold said members in one of their positions with a force equal to the normal force they are called upon to transmit and to release said members when the normal force is exceeded, said biasing means extending at substantially a right angle to the link with which it cooperates in all positions of that link, said members being reset into operative relation by moving them back to said one position.

24. An overload release mechanism for power transmitting connections, said mechanism including a pair of relatively movable members and pivoted links, biasing means pivotally associated with one of the members and capable of swinging movement to hold them in extended or retracted position, said last named means arranged to yieldingly hold said members in one of their positions with a force equal to the normal force they are called upon to transmit and to release said members when the normal force is exceeded, and means for adjusting the effective force of said biasing means to determine the normal force said connections are capable of transmitting.

25. The combination with a tractor and an implement propelled thereby, said implement comprising a member movable thereon, of power take-off means on the tractor, mechanism for transmitting motion from said power take-off means to said movable member, said motion transmitting mechanism comprising members including toggle means adapted to move relative to one another, and yieldable means resisting said relative movement for preventing the transmission of an overload through said mechanism, said yielding means arranged to exert a decreasing resistance with an increasing relative movement between the members.

26. An overload release mechanism for transmitting power comprising a pair of cooperating driving and driven members, and yieldable means connecting said members and including pivotally connected swingable means tending under normal conditions to hold the driving and driven members in power transmitting relation and operating upon overload to assist in interrupting the power transmitting relationship between said members.

27. An overload release mechanism for power connections comprising a pair of cooperating driving and driven members adapted to transmit oscillatory movements, toggle levers connecting said members, pivotally mounted spring means acting between said toggle lever and said members and tending under normal conditions to hold the driving and driven members in motion transmitting relation and operating after overload to assist in interrupting the motion transmitting relation of said members.

28. An overloaded release mechanism for power transmitting connections, said mechanism including a pair of relatively movable members, and means connecting said members and having biasing means swingably associated with one of said members to hold both members in motion transmitting relation with an effective force equal to the normal force said members are to transmit and to release said members under an excessive force, said biasing means being arranged to hold said members in non-transmitting relation with an effective force less than said normal force.

29. An overload release mechanism for a power transmitting connection, said mechanism comprising two cooperating relatively movable driving and driven members, a pair of links pivoted to said driving member and extending from one side thereof, yieldable means pivotally mounted for swinging movement on said driving member and biasing said links for swinging movement relative to said driving member, a pair of links pivoted to the driven member on a side thereof corresponding to the side of the driving member having the first pair of links extending therefrom and pivoted to the other pair of links so that relative movement of said members will occasion a swinging movement of said first pair of links, said yeldable means holding said members in extended or retracted position, and holding the members in one of their positions with a force equal to the normal force they are called upon to transmit and to release said members when the normal force is exceeded, said two pair of links adapted, when said members are in retracted position, to lie adjacent one another with the points of pivotal connection nearly in a straight line and, when said members are in extended position, to lie just beyond a perpendicular position, one relative to the other, said yieldable means biasing said first pair of links being always substantially at right angles to said links and being always substantially inclined to said driving member, said members being reset into operative retracted position by moving them back to said position.

30. An overload release mechanism for power transmitting connections, said mechanism including a pair of relatively movable members and pivotally connected links, and biasing means pivotally associated for swinging movement with one of the members to hold them in extended or retracted position, said last named means arranged to cooperate with the links to yieldingly hold said members in one of their positions with a force equal to the normal force they are called upon to transmit and to release said members when the normal force is exceeded, said members being reset into operative retracted position by moving them back to said one position, said biasing means being substantially at a right angle to the links with which it cooperates in all positions of those links and being inclined relative to one of said members in said members' extended and retracted positions.

31. An overload release mechanism for power transmitting connections, said mechanism comprising two cooperative driving and driven members adapted to have conjoint movement for transmitting motion therebetween, said driving member being adapted to move relative to said driven member, and connecting means for connecting said members and including restraining means adapted to constrain said members from relative movement under normal load conditions, said restraining means being pivotally mounted directly on one of said members for swinging movement relative thereto and being capable of functioning at an angle to one of said members.

32. An overload release mechanism for power transmitting connections, said mechanism comprising two cooperating driving and driven members adapted to have conjoint movement for transmitting motion, and yieldable means connecting said members and including means swingably connected with one of said members and cooperating therewith to restrain relative movement therebetween with an effective force substantially equal to the maximum normal load on said driven member, said effective force acting through said yieldable means and being convertible into a force tending to separate said members by predetermined relative movement of the latter.

33. An overload release mechanism for power transmitting connections, said mechanism comprising two cooperating driving and driven members adapted to have conjoint movement for transmitting reciprocatory motion, said driving member being adapted to move relative to said driven member when an abnormal load reacts upon said driven member, and yieldable means connecting said members and including a rod pivotally mounted for swinging movement upon one of said members and a spring disposed about the rod and coacting between said rod and said one member, said rod and spring being movable into one position to constrain relative movement between said members with an effective force substantially equal to a normal maximum load upon said driven member during reciprocation of said members and movable into another position to allow relative movement between said members, said rod and spring being adapted to be restored to said one position upon subsequent reciprocation of said members.

THEOPHILUS BROWN.